US012285964B2

(12) United States Patent
Lin

(10) Patent No.: US 12,285,964 B2
(45) Date of Patent: Apr. 29, 2025

(54) STRUCTURE OF SCREEN PRINTING PLATE AND MANUFACTURING METHOD OF SCREEN PRINTING PLATE

(71) Applicant: DARWIN PRECISIONS CORPORATION, Hsinchu County (TW)

(72) Inventor: Jen Shun Lin, Hsinchu County (TW)

(73) Assignee: DARWIN PRECISIONS CORPORATION, Hsinchu County (TW)

( * ) Notice: Subject to any disclaimer, the term of this patent is extended or adjusted under 35 U.S.C. 154(b) by 181 days.

(21) Appl. No.: 18/098,721

(22) Filed: Jan. 19, 2023

(65) Prior Publication Data

US 2024/0149602 A1 May 9, 2024

(30) Foreign Application Priority Data

Nov. 4, 2022 (TW) ................................ 111142198

(51) Int. Cl.
*B41N 1/24* (2006.01)
*B41C 1/14* (2006.01)

(52) U.S. Cl.
CPC ................ *B41N 1/241* (2013.01); *B41C 1/14* (2013.01)

(58) Field of Classification Search
None
See application file for complete search history.

(56) References Cited

FOREIGN PATENT DOCUMENTS

| | | | | | |
|---|---|---|---|---|---|
| CN | 202368049 | U | * | 8/2012 | |
| CN | 204641027 | U | | 9/2015 | |
| CN | 106313871 | A | * | 1/2017 | |
| CN | 210501841 | U | | 5/2020 | |
| CN | 109130454 | B | | 12/2020 | |
| CN | 112319023 | A | * | 2/2021 | ............. B41F 15/36 |
| CN | 214821747 | U | | 11/2021 | |
| KR | 20200103396 | A | * | 9/2020 | |
| TW | M431064 | U1 | | 6/2012 | |
| TW | M603831 | U | | 11/2020 | |

OTHER PUBLICATIONS

English language translation of KR 10-2020-0103396 A to Kang, publication date Sep. 2, 2020. (Year: 2020).*

(Continued)

*Primary Examiner* — Leslie J Evanisko

(57) ABSTRACT

A structure of a screen printing plate comprises a supporting frame, a composite screen, a first and a second adhesive body, and an adhesive tape. The composite screen is connected to the supporting frame and comprises a first and a second screen. The first screen is disposed along the supporting frame and encloses a central region. The second screen covers the central region and is in partial overlapped with and connected to the first screen, wherein the screens are made from different materials. The first adhesive body is disposed between the first and the second screens and connects them. The second adhesive body is disposed on one side of the composite screen and covers the first adhesive body. The adhesive tape is opposite to the second adhesive body and is disposed on the other side of the composite screen. A manufacturing method of a screen printing plate is also provided.

12 Claims, 3 Drawing Sheets

(56) References Cited

OTHER PUBLICATIONS

English language translation of CN 106313871 A to Murakami et al., publication date Jan. 11, 2017. (Year: 2017).*
English language translation of CN 112319023 A to Chen et al., publication date Feb. 5, 2021. (Year: 2021).*
English language translation of CN 202368049 U to Lin, publication date Aug. 8, 2012. (Year: 2012).*

* cited by examiner

STRUCTURE OF SCREEN PRINTING PLATE AND MANUFACTURING METHOD OF SCREEN PRINTING PLATE

FIELD OF THE INVENTION

The present invention relates to a structure of a screen printing plate, and particularly relates to a structure of a composite screen printing plate and a manufacturing method of the composite screen printing plate.

BACKGROUND OF THE INVENTION

Screen printing technology can be used in various materials such as plastics, textiles, metals, glass and ceramics and can be applied to various industries such as advertising, arts, decorating, building, publishing, printing and dyeing, and technology industry; wherein, in response to demands for high precision in some industries such as the electronics industry and the optoelectronic industry, composites screen printing plates are developed to meet printing precision. The composite screen printing plate uses screen cloth of different materials, and pieces of the different screen cloth are usually bound through a glue material. However, the tensile force among the pieces of the screen cloth and the liquid chemicals applied when performing the screen printing will weaken the binding force so as to shorten the lifespan of the screen printing plate.

SUMMARY OF THE INVENTION

The present invention provides a structure of a screen printing plate, which has a relatively long lifespan.

The structure of the screen printing plate comprises a supporting frame, a composite screen, a first adhesive body, a second adhesive body and an adhesive tape. The composite screen is connected to the supporting frame and comprises a first screen and a second screen. The first screen is disposed along the supporting frame and encloses a central region. The second screen covers the central region and is in partial overlapped with and connected to the first screen, wherein the material of the first screen and the material of the second screen are different. The first adhesive body is disposed between the first screen and the second screen, and connects the first screen and the second screen. The second adhesive body is disposed on one side of the composite screen and covers the first adhesive body. The adhesive tape is opposite to the second adhesive body and is disposed on the other side of the composite screen.

In an embodiment of the present invention, the first screen is further fixed to the supporting frame and stretches the second screen by the tensile force.

In an embodiment of the present invention, the second adhesive body is further disposed on the first screen and covers a portion of the first screen overlapped with the second screen; a width of the second adhesive body is greater than a width of the portion of the first screen overlapped with the second screen.

In an embodiment of the present invention, the second adhesive body is further connected to the supporting frame, extends towards the central region, and covers the second screen.

In an embodiment of the present invention, the adhesive tape is disposed on the first screen and the second screen and connects the screen and the second screen.

In an embodiment of the present invention, the adhesive tape is further disposed on the portion of the first screen overlapped with the second screen.

In an embodiment of the present invention, the adhesive tape further extends towards the central region and extends out of the portion of the first screen overlapped with the second screen.

In an embodiment of the present invention, the material of the first screen is an artificial fiber, and the first adhesive body further penetrates into the fibers of the first screen; the material of the second screen is a metal, and an opening pattern is formed on the second screen.

The present invention further provides a manufacturing method of a screen printing plate, including: providing a supporting frame; providing a first screen, connecting the first screen and the supporting frame, and fixing the first screen to the supporting frame; providing a second screen, disposing the second screen on the first screen, and making the second screen overlapped with the first screen; disposing a first adhesive body in the supporting frame and connecting the first screen and the second screen; wherein the first adhesive body forms a closed geometric figure and encloses a central region; removing the first screen located in the central region; disposing an adhesive tape on one side of the first screen; and disposing a second adhesive body on the other side of the first screen and covering the first adhesive body.

In an embodiment of the present invention, the step of disposing the adhesive tape further includes disposing the adhesive tape on the first screen and the second screen, and connecting the first screen and the second screen with the adhesive tape.

In an embodiment of the present invention, the step of removing the first screen located in the central region further includes forming an overlapped region, wherein the overlapped region has the first screen and the second screen.

In an embodiment of the present invention, the step of disposing the second adhesive body further includes covering the overlapped region with the second adhesive body.

In an embodiment of the present invention, the step of disposing the second adhesive body further includes connecting the first screen and the supporting frame with the second adhesive body, and the step of disposing the adhesive tape further includes making the adhesive tape extend to the supporting frame.

According to the present invention, since at least two adhesive bodies are provided, wherein the first adhesive body connects the first screen and the second screen, and the second adhesive body covers the first adhesive body, the structure of the screen printing plate has tolerance to solvents and long lifespan. According to the present invention, since the adhesive tape is provided, and the adhesive tape is opposite to the second adhesive body and is disposed on the other side of the composite screen, it is helpful to dispose the second adhesive body, and to improve the strength of the composite screen and to prolong the lifespan thereof.

DETAILED DESCRIPTION OF PREFERRED EMBODIMENTS

The above-mentioned and other technical contents, characteristics and functions about the present invention can be presented clearly below in combination of detailed description of a preferred embodiment of reference drawings. Direction terms mentioned in the embodiments below, for example, up, down, left, right, front, back, top or bottom are merely directions with reference to the drawings. Therefore, the used direction terms are used for describing, rather than limiting, the present invention.

Figure 1:
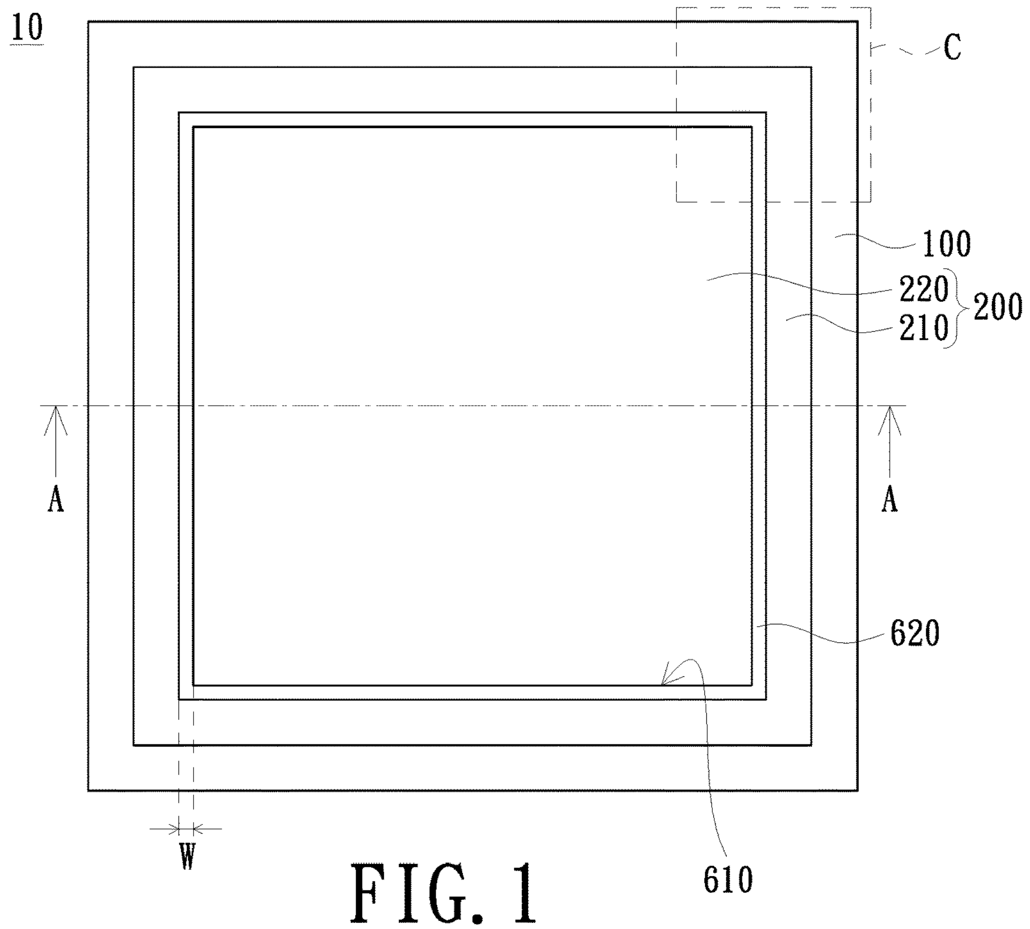
FIG. 1 is a schematic diagram of a top view of a structure of a screen printing plate in an embodiment of the present invention.
Figure 2:
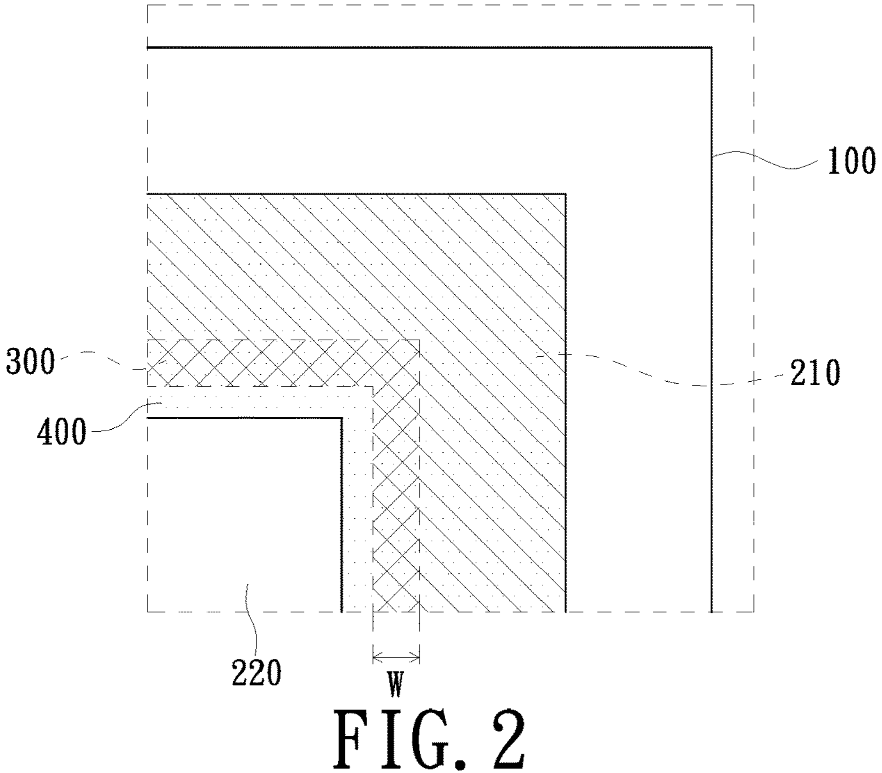
FIG. 2 is a schematic diagram of a partially enlarged view from a portion C shown in FIG. 1.
Figure 3:
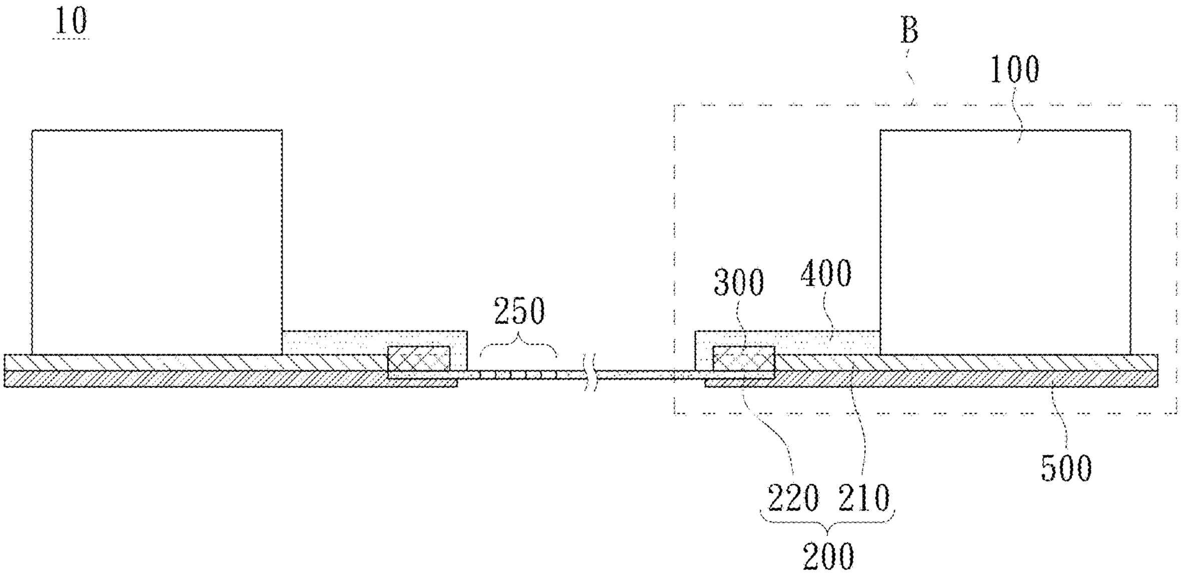
FIG. 3 is a schematic diagram of a cross-sectional view along a section line A-A shown in FIG. 1.
Figure 4:
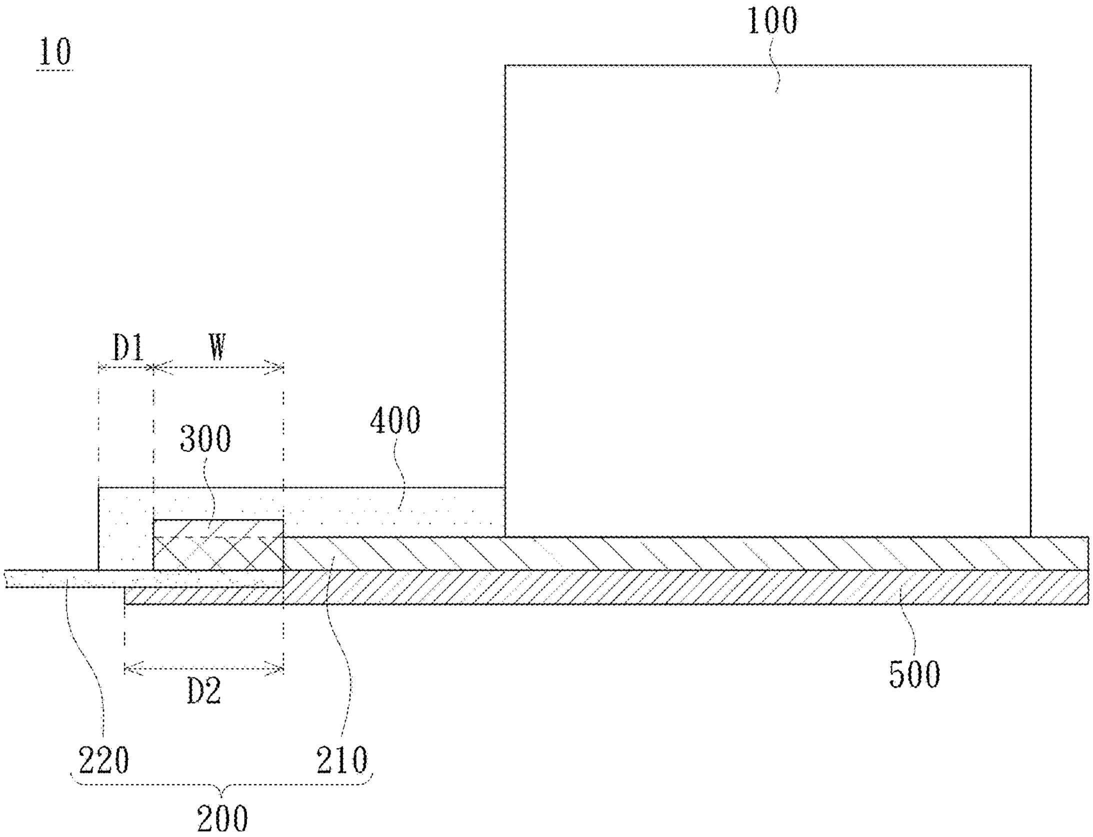
FIG. 4 is a schematic diagram of a partially enlarged view from a portion B shown in FIG. 2.
Figure 5:
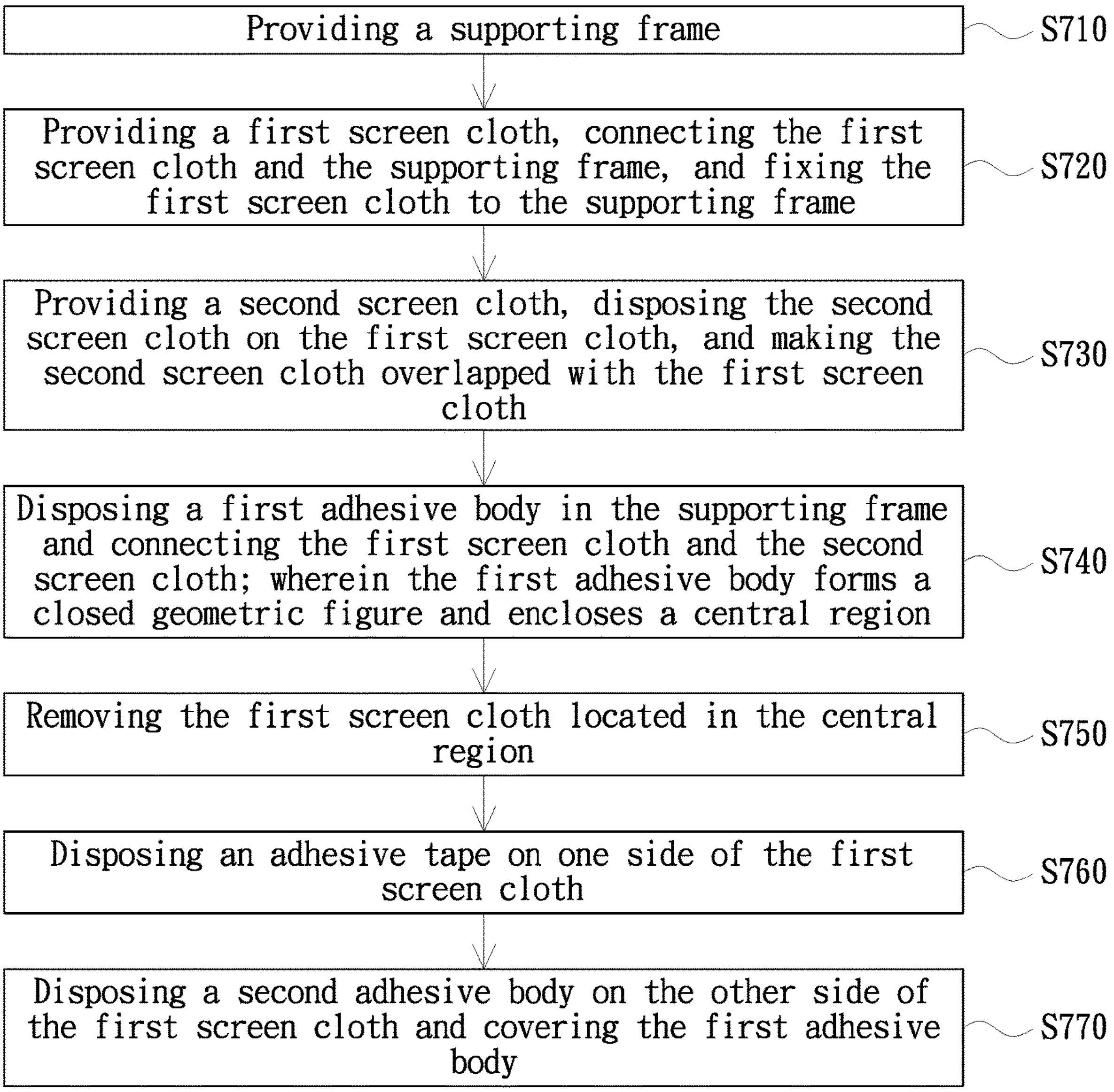
FIG. 5 is a schematic diagram of a flow of a manufacturing method of a screen printing plate in an embodiment of the present invention.

FIG. 1 is a schematic diagram of a top view of a structure of a screen printing plate in an embodiment of the present invention. FIG. 2 is a schematic diagram of a partially enlarged view from a portion C shown in FIG. 1. FIG. 3 is a schematic diagram of a cross-sectional view along a section line A-A shown in FIG. 1. FIG. 4 is a schematic diagram of a partially enlarged view from a portion B shown in FIG. 2. In a printing operation, one side of the structure of the screen printing plate is used as a scraper side and the other side thereof is used as an ink-leaking side. The upper side of the structure of the screen printing plate in FIGS. 3-4 can be regarded as the scraper side and the lower side thereof can be regarded as the ink-leaking side.

As shown in FIGS. 1-4, in the embodiment of the present invention, the structure of the screen printing plate 10 comprises a supporting frame 100 and a composite screen 200, and the composite screen 200 is connected to the supporting frame 100. The connection can be performed by any means, which are not described in detail herein. The composite screen 200 comprises a first screen 210 and a second screen 220. The first screen 210 and the second screen 220 are made from different materials. In other words, the composite screen 200 is formed by more than two kinds of materials.

In the embodiment of the present invention, the first screen 210 is disposed along the supporting frame 100, i.e., the first screen 210 and the supporting frame 100 substantially correspond to each other in shape. As shown in FIG. 1, the first screen 210 is disposed along every side of the supporting frame 100 and encloses a central region 610. In the embodiment, the central region 610 is substantially rectangular. The second screen 220 is mostly located in the central region 610 and covers the central region 610, and a peripheral portion of the second screen 220 is overlapped with and connected to the first screen 210, wherein the overlapped region 620 of the first screen 210 and the second screen 220 is adjacent to and encloses the central region 610. As shown in FIG. 3-4, the second screen 220 is disposed under the first screen 210. In some embodiments, however, the up and down therebetween can be reverse, for example, the second screen 220 is located over the first screen 210.

The first screen 210 is further fixed to the supporting frame 100 and is connected to such as a bottom of the supporting frame 100, and the first screen 210 stretches the second screen 220 by the tensile force. In the preferred embodiment of the present invention, the material of the first screen 210 is an artificial fiber and a fabric thereof such as nylon fabric and polyester fabric, which is not limited thereto. The material of the second screen 220 is a metal. Specifically, the second screen 220 is a metal film or a metal net. The second screen 220 can have an opening pattern 250 for a printing ink to print on an object.

As shown in FIGS. 1-2 and FIG. 4, the structure of the screen printing plate 10 further comprises a first adhesive body 300 and a second adhesive body 400. The first adhesive body 300 is disposed between the first screen 210 and the second screen 220, and connects the first screen 210 and the second screen 220. The first adhesive body 300 is, for example, a quick-drying adhesive. Preferably, as shown in FIGS. 1-2, the first adhesive body 300 is disposed along every side of the second screen 220 and is located in the overlapped region 620. As shown in FIG. 3, the first adhesive body 300 can be disposed in the whole overlapped region 620, which is however not limited thereto. In some embodiments of the present invention, the first adhesive body 300 can also be disposed in a part of the overlapped region 620 so that a width of the first adhesive body 300 can be smaller than a width W of the overlapped region 620. For example, the width of the first adhesive body 300 can be such as 20 mm. In conclusion, the first adhesive body 300 is disposed to fix the first screen 210 and the second screen 220 to each other. In addition, the first adhesive body 300 can penetrate into the fibers of the first screen 210 so that a part of the first screen 210 can be adhesive and adheres to the second screen 220.

The second adhesive body 400 is disposed on one side of the composite screen 200. As shown in FIG. 2 and FIG. 4, the second adhesive body 400 on the side covers the first adhesive body 300 and/or covers an edge of the second screen 220 (not shown in the drawings). The second adhesive body 400 can further cover the overlapped region 620 of the first screen 210 and the second screen 220. In the embodiment of the present invention, the second adhesive body 400 is disposed on the scraper side and can further go beyond the overlapped region 620 so that the width thereof can be greater than the width W. The second adhesive body 400 is waterproof and is tolerant to organic solvents, accordingly, the second adhesive body 400 on the scraper side can prevent the first adhesive body 300 from contacting the printing ink and liquid chemicals and from being damaged so that the lifespan of the composite screen 200 can be prolonged. In some embodiments of the present invention, the material of the second adhesive body 400 can be such as an epoxy curing adhesive, which is however not limited thereto.

In the preferred embodiment of the present invention, the second adhesive body 400 can go beyond the overlapped region 620 and extend towards the supporting frame 100 and/or the central region 610. In the embodiment shown in FIG. 4, the second adhesive body 400 extends towards the supporting frame 100 and is disposed on the first screen 210, that is, the second adhesive body 400 can cover the first screen 210. The coverage of the second adhesive body 400 is helpful to prevent the printing ink and the liquid chemicals from penetrating into the fibers of the first screen 210 so as to prevent the printing ink and the liquid chemicals from affecting the first adhesive body 300 through the fibers. The second adhesive body 400 can further be disposed between the overlapped region 620 and the supporting frame 100, cover the first screen 210 totally and be connected to the supporting frame 100.

As shown in FIG. 4, the second adhesive body 400 goes beyond the overlapped region 620 and extends towards the central region 610. In the embodiment of the present invention, the extent of the second adhesive body 400 extending towards the central region 610 D1 can be 1-10 mm. The second adhesive body 400 can further cover the second screen 220. Since the second adhesive body 400 extends towards the central region 610, it is ensured that an edge of the first screen 210 can be sealed by the second adhesive body 400 and that the connection between the first screen 210 and the second screen 220 is strengthened. Preferably, the second adhesive body 400 is further characterized by the high hardness. When performing the printing, the extending second adhesive body 400 can provide protection and reduce the influence of the scraper on the first adhesive body 300 and on a junction of the first screen 210 and the second screen 220.

As shown in FIG. 4, the structure of the screen printing plate 10 further comprises an adhesive tape 500. The adhesive tape 500 is opposite to the second adhesive body 400 and disposed on the other side of the composite screen 200. Further speaking, the adhesive tape 500 is disposed on the first screen 210 and the second screen 220 and connects the first screen 210 and the second screen 220. In the embodiment of the present invention, the adhesive tape 500 is disposed on the ink-leaking side.

The adhesive tape 500 on the first screen 210 can further extend to the supporting frame 100. Preferably, a scope of the adhesive tape 500 disposed on the other side of the first screen 210 can depend on and correspond to a scope of the second adhesive body 400 covering the first screen 210 and extending towards the supporting frame 100. In some embodiments of the present invention, the adhesive tape 500 is also disposed on an ink-leaking side of the first screen 210. For example, when the first screen 210 is connected to the bottom of the supporting frame 100, the adhesive tape 500 can extend to the bottom of the supporting frame 100.

As shown in FIG. 4, the adhesive tape 500 is disposed on the first screen 210 and the second screen 220, wherein the extent D2 of the adhesive tape 500 exceeding the first screen 210 can be 1-25 mm. In the embodiment shown in FIG. 4, the adhesive tape 500 further extends to the overlapped region 620 of the first screen 210 and the second screen 220. In some embodiments of the present invention, the adhesive tape 500 further extends out of the overlapped region 620.

The adhesive tape 500 in the embodiment of the present invention is waterproof and tolerant to organic solvents. For example, the material of the adhesive tape 500 can be such as a metal, a plastic and a silicone adhesive material. The adhesive tape 500 can play a role of embellishing the composite screen 200, for example, making a surface of the ink-leaking side thereof be evener. The adhesive tape 500 is preferably small in thickness. Since the adhesive tape 500 connects the first screen 210 and the second screen 220 and covers the first screen 210, the printing ink and the liquid chemicals can be prevented from penetrating into the fibers of the first screen 210 so as to prevent the printing ink and the liquid chemicals from affecting the first adhesive body 300 through the fibers.

The present invention also provides a manufacturing method of a screen printing plate, which includes steps S710-S770; wherein, the step S710: providing a supporting frame; the step S720: providing a first screen, connecting the first screen and the supporting frame, and fixing the first screen to the supporting frame; the step S730: providing a second screen, disposing the second screen on the first screen, and making the second screen overlapped with the first screen; the step S740: disposing a first adhesive body in the supporting frame and connecting the first screen and the second screen; wherein the first adhesive body forms a closed geometric figure and encloses a central region; the step S750: removing the first screen located in the central region; the step S760: disposing an adhesive tape on one side of the first screen; and the step S770: disposing a second adhesive body on the other side of the first screen and covering the first adhesive body. The steps S710-S770 are further described as follows with the embodiments shown in FIGS. 1-4.

The supporting frame 10 provided in the step S710 can be usually a metal frame such as an aluminum frame. As shown in FIGS. 1-4, the first screen 210 provided in the step S720 preferably corresponds to the supporting frame 100 in shape. The connection and the fixation in the step S720 can be performed by any means. In some embodiments of the present invention, the first screen 210 is connected on the ink-leaking side and is fixed to the bottom of the supporting frame 100. The step S720 can further include stretching the first screen 210 so that the first screen 210 generates the tensile force along with the connection and the fixation.

The second screen 220 provided in the step S730 preferably corresponds to the supporting frame 100 in shape. In some embodiments of the present invention, an area of the second screen 220 can be smaller than an inside area of the supporting frame 100. The overlapping in the step S730 further includes leaning the second screen 220 against the first screen 210 so as to be conductive to performing the step S740. In the preferred embodiment of the present invention, the second screen 220 can be overlapped with the first screen 210 on the ink-leaking side. After leaning the second screen 220 against the first screen 210, the second screen 220 and the first screen 210 can be temporarily fixed with an adhesive tape. On the other hand, the adhesive tape can also be used to circumscribe a scope so as to be conductive to performing the step S740 (described below). Since the area of the second screen 220 can be smaller than the inside area of the supporting frame 100, the edge of the second screen 220 can be apart from the supporting frame 100 after the overlapping.

The first adhesive body 300 disposed in the step S740 can be such as the quick-drying adhesive for connecting the first screen 210 and the second screen 220. For example, the first adhesive body 300 can be disposed on the first screen 210, wherein the first adhesive body 300 can penetrate into the fibers of the first screen 210 and adheres to the second screen 220. The first adhesive body 300 is substantially disposed along every side of the second screen 220 so as to form the geometric figure and to enclose the central region 610, wherein the first adhesive body 300 can be further disposed according to the scope circumscribed by the adhesive tape in the step S730. As shown in FIGS. 1-2, for example, when the supporting frame 100 is rectangular, the first adhesive body 300 disposed in the step S740 can be square-shaped and the central region 610 can be rectangular. In some embodiments of the present invention, as shown in FIG. 4, the first adhesive body 300 can be disposed close to the edge of the second screen 220.

The step S740 can further include confirming that the first screen 210 and the second screen 220 have been adhered to and fixed to each other. The step S750 can be performed by any means. In the step S750, the first screen 210 in the central region 610 is substantially removed to form the composite screen 200. The step S750 further includes forming an overlapped region 720. The overlapped region 720 has the first screen 210 and the second screen 220.

The adhesive tape 500 disposed in the step S760 has the characteristics as mentioned above. The step S760 further includes disposing the adhesive tape 500 on the ink-leaking side and on the first screen 210 and the second screen 220, and connecting the first screen 210 and the second screen 220 with the adhesive tape 500. The adhesive tape 500 can play a role of embellishing the composite screen 200, for example, making the surface of the ink-leaking side thereof evener so that the composite screen 200 can lean against the object to be printed more closely. On the other hand, the adhesive tape 500 can cover pores among the fibers of the first screen 210 and further prevent the second adhesive body 220 in the step S770 (described below) from seeping out on the ink-leaking side. In some embodiments of the present invention, the step S760 can further include extending the adhesive tape 500 to the supporting frame 100, or disposing the adhesive tape 500 on the overall ink-leaking side of the first screen 210.

The step S770 further includes disposing the second adhesive body 400 on the scraper side to cover the first adhesive body 300. The second adhesive body 400 has the above-mentioned characteristics and can be such as the epoxy curing adhesive. The second adhesive body 400 after curing can prevent the first adhesive body 300 from contacting the printing ink and the liquid chemicals and from being damaged so that the lifespan of the composite screen 200 is prolonged. The step S770 can further include covering the overlapped region 620 of the first screen 210 and the second screen 220 with the second adhesive body 400.

In the preferred embodiment of the present invention, the step S770 further includes disposing the second adhesive body 400 on the first screen 210 and extending the same towards the supporting frame 100. Since the adhesive tape 500 has been disposed on the ink-leaking side in the step S760, the second adhesive body 400 disposed in the step S770 does not or hardly seep out on the ink-leaking side. The second adhesive body 400 can further penetrate into the fibers of the first screen 210 and cover the pores among the fibers. The second adhesive body 400 can further be disposed on the supporting frame 100 and connect the first screen 210 and the supporting frame 100.

In some embodiments of the present invention, the step S770 further includes disposing the second adhesive body 400 and extending the second adhesive body 400 towards the central region 610, and making the second adhesive body to go beyond the overlapped region 620 and to further seal the edge of the first screen 210. Accordingly, the connection between the first screen 210 and the second screen 220 is enhanced, which is therefore helpful in reducing the influence of the scraper on the first adhesive body 300 and on the junction of the first screen 210 and the second screen 220.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A structure of a screen printing plate, comprising:
- a supporting frame;
- a composite screen connected to the supporting frame, comprising:
  - a first screen disposed along the supporting frame and enclosing a central region; and
  - a second screen covering the central region and being in partial overlapped with and connected to the first screen; wherein the material of the first screen and the material of the second screen are different;
- a first adhesive body and a second adhesive body, wherein:
  - the first adhesive body is disposed between the first screen and the second screen and connects the first screen and the second screen; and
  - the second adhesive body is disposed on one side of the composite screen and covers the first adhesive body; and
- an adhesive tape is opposite to the second adhesive body and is disposed on the other side of the composite screen, and is disposed on a portion of the first screen overlapped with the second screen and extending to the supporting frame.

2. The structure of a screen printing plate according to claim 1, wherein the first screen is further fixed to the supporting frame and stretches the second screen by the tensile force.

3. The structure of a screen printing plate according to claim 1, wherein the second adhesive body is further disposed on the first screen and covers a portion of the first screen overlapped with the second screen; a width of the second adhesive body is greater than a width of the portion of the first screen overlapped with the second screen.

4. The structure of a screen printing plate according to claim 1, wherein the second adhesive body is further connected to the supporting frame, extends towards the central region, and covers the second screen.

5. The structure of a screen printing plate according to claim 1, wherein the adhesive tape is disposed on the first screen and the second screen and connects the first screen and the second screen.

6. The structure of a screen printing plate according to claim 1, wherein the adhesive tape further extends towards the central region and extends out of the portion of the first screen overlapped with the second screen.

7. The structure of a screen printing plate according to claim 1, wherein the material of the first screen is an artificial fiber, and the first adhesive body further penetrates into the fibers of the first screen; the material of the second screen is a metal, and an opening pattern is formed on the second screen.

8. A manufacturing method of a screen printing plate, including:
- providing a supporting frame;
- providing a first screen, connecting the first screen and the supporting frame, and fixing the first screen to the supporting frame;
- providing a second screen, disposing the second screen on the first screen, and making the second screen overlapped with the first screen;
- disposing a first adhesive body in the supporting frame and connecting the first screen and the second screen; wherein the first adhesive body forms a closed geometric figure and encloses a central region;
- removing the first screen located in the central region;
- disposing an adhesive tape on one side of the first screen and a portion of the first screen overlapped with the second screen, and making the adhesive tape extend to the supporting frame; and
- disposing a second adhesive body on the other side of the first screen and covering the first adhesive body.

9. The manufacturing method of a screen printing plate according to claim 8, wherein the step of disposing the adhesive tape on the portion of the first screen overlapped with the second screen further includes disposing the adhesive tape on the first screen and the second screen, and connecting the first screen and the second screen with the adhesive tape.

10. The manufacturing method of a screen printing plate according to claim 8, wherein the step of removing the first screen located in the central region further includes forming an overlapped region, wherein the overlapped region has the first screen and the second screen.

11. The manufacturing method of a screen printing plate according to claim 10, wherein the step of disposing the second adhesive body further includes covering the overlapped region with the second adhesive body.

12. The manufacturing method of a screen printing plate according to claim 8, wherein the step of disposing the second adhesive body further includes connecting the first screen and the supporting frame with the second adhesive body.

* * * * *